United States Patent [19]

Yudin et al.

[11] Patent Number: 5,425,890
[45] Date of Patent: Jun. 20, 1995

[54] SUBSTITUTE REFRIGERANT FOR DICHLORODIFLUOROMETHANE REFRIGERATION SYSTEMS

[75] Inventors: Boris V. Yudin, Moscow Region,

[73] Assignee: APD Cryogenics, Inc., Allentown, Pa.

[21] Appl. No.: 180,208

[22] Filed: Jan. 11, 1994

[51] Int. Cl.⁶ .............................................. C09K 5/04
[52] U.S. Cl. ...................................... 252/67; 62/114
[58] Field of Search ........................... 252/67; 62/114

[56] References Cited

U.S. PATENT DOCUMENTS 4,482,465 11/1984 Gray .................................. 252/67
5,240,630 8/1993 Sabahi et al. ...................... 252/68

FOREIGN PATENT DOCUMENTS 0314978  5/1978  European Pat. Off. .
1-139675 6/1989  Japan .
1-139684 6/1989  Japan .
1-141982 6/1989  Japan .
91/14751 10/1991 WIPO .
91/16390 10/1991 WIPO .

OTHER PUBLICATIONS

Vineyard et al, Chem. Abs 120(16):194860v, "Cycle Performance Comparison", Aug. 1991.
"A Survey of Current Worldwide Research on the Thermophysical Properties of Alternative Refrigerants", NISTIR 3969, McLinden, et al, Jun. 1991.

Primary Examiner—Christine Skane
Attorney, Agent, or Firm—Helfgott & Karas

[57] ABSTRACT

A mixed gas refrigerant for use as a replacement for CFC refrigerants, and specifically, for R-12, which includes at least three components including R-134a, R-124, and n-butane.

4 Claims, 4 Drawing Sheets

SUBSTITUTE REFRIGERANT FOR DICHLORODIFLUOROMETHANE REFRIGERATION SYSTEMS

BACKGROUND OF THE INVENTION

This invention relates to a mixed gas refrigerant (MR), and more particularly to a mixed refrigerant for use as a replacement of an existing chlorofluorocarbon refrigerant.

Chloronated fluorocarbon refrigerants (CFC) have been implicated in causing environmental damage. Specifically, these gases which are very inert, are released from the refrigeration systems at ground level and diffused into the upper atmosphere. Because of their inertness, the gases are able to survive without decomposition until they reach the stratosphere where they are broken down by ultraviolet radiation, releasing chlorine atoms which break down the stratospheric ozone layer. There has recently been considerable concern about reductions in stratospheric ozone levels and this has led to bans on certain CFC's such as R-12, R-11, and others.

In automobile air conditioning systems, typically R-12 has been utilized. As such has been banned for future use after a given phase-out period, alternatives have been considered. At present, the best known new refrigerant for replacement of R-12 for automobile air conditioning use has been considered R-134A. While this material comprised of $C_2H_2F_4$ is ozone safe, it will not work in most existing automobile air conditioning systems using R-12 without expensive retro-fitting. Various automobile manufacturers are already installing new equipment in new automobiles scheduled for future sales which will accommodate the R-134A refrigerant. However, for the many existing automobiles, the imposition of the restrictions on R-12 will require such retrofitting. Knowledgeable estimates predict a costly conversion requirement-to convert the air conditioning systems to make it compatible with R-134A.

Considerable efforts are being made to provide a replacement for R-12 in order to permit utilization of existing automobile air conditioning systems without unnecessary expensive retro-fitting. One type of refrigerant that has been given considerable attention are the hydrocarbons and, especially, propane. While propane has many useful thermodynamic properties which could perhaps serve as a replacement for R-12, unfortunately, its flammability prohibits its direct use. Proposals have therefore been to combine various hydrocarbons with other ingredients in order to provide an adequate mixture for replacement of R-12.

Hydrocarbon mixtures in general provide excellent thermodynamic properties for replacement of R-12, as well as other refrigerants which are being banned. However, numerous very rigorous standards exist for flammability testing and in order to meet some of the most restrictive flammability standards, it is necessary to greatly restrict the hydrocarbon content even though it may sacrifice the thermodynamic properties.

Furthermore, in designing a specific mixture, additional factors and constraints must be taken into consideration. Specifically, there are environmental safety conditions which must be met including sufficiently low ozone depletion potential, as well as sufficiently low global warming potential. Furthermore, the ultimate result should be of low toxicity.

There also exist additional constraints which must be met including material compatibility so that the resulting refrigerant will not deteriorate the material from which the systems are constructed. As to developing a replacement refrigerant, one of the most important parameters is hose penetration. Oil compatibility is also a severe problem since the oil must be a part of the air conditioning system and the gas mixture must be able to accommodate oils that are already on the market, including certain synthetic akylbenzenes and esters.

The mixed refrigerant must also be compatible with the particular equipment that is being utilized within the refrigerating system. There also exist the performance requirement so that the mixture must have its thermodynamic characteristics closely match those of the refrigerant being replaced and must have a co-efficient of performance sufficiently high to provide efficient results with the system being utilized.

An additional problem is with respect to the relationship of the boiling point of the components in a mixed gas refrigerant. When taking a blend of components, in most cases as the temperature increases, the component with the highest boiling point escapes faster and the liquid phase tends to become enriched with the components of lower boiling point. If the remaining components are of greater flammability, then even if the original composition is not of a flammable nature, the liquid phase remaining becomes of a flammable nature. Furthermore, a problem also exists in the escaping vapor phase if that is passing an environment that might cause flammability. Thus, the differential escape rate of the various components must be addressed to avoid having a greater amount of flammable components after evaporation of other of the components.

The above problem is even further compounded in that the situation is not consistent with all components. It is well known, that where components join to provide azeotropic mixtures, the separation between the components does not proceed in the same sequence as does the respective sequence of their decreasing boiling points. On the contrary, for azeotropic mixtures it works in reverse. Thus, the escape is not necessarily in accordance with the sequence of the boiling points of the components in the overall mixture.

Finally, there are commercial aspects, namely the components of the mixture should be relatively cheap and available on the market.

In designing mixtures to meet some of these constraints, sacrifices must be made. For example, while hydrocarbons provide good oil compatibility, they are of high flammability. On the other hand, fluorocarbons are generally of flame-retardant capabilities, however, they present problems with oil compatibility. Each of these has its own unique ozone depletion potential and global warming potential, and generally, it is required that the ozone and global problem should not be worse than the levels which may be acceptable according to the current government regulations.

In connection with the automobile air conditioning business, the flammability tests imposed are so severe that the presence of hydrocarbon itself or any other flammable material must be severely limited.

It has therefore become of significance to try and provide a replacement for R-12 in order to avoid the necessity of redesigning and retrofitting existing air conditioner compressors in automobiles. Numerous recommendations have thus far been made with many, many blends being suggested. While some of these provide certain of the features required, thus far most if not all of them have failed on other tests. For example, while many of them provide initial non-flammability properties, during continued testing of the rigorous flammability tests required in the automobile industry these mixtures have failed. Others have failed because they are permeable to the hoses. Accordingly, while there have been many, many suggestions, but thus far there has been no clear replacement that has been acceptable.

Additionally, because of the numerous available components that can be utilized in various mixture combinations, and because of the various percentages of utilization of each of these components, the number of possibilities is almost infinite and the ability to be able to provide an optimized replacement which satisfies all of the conditions has been a most challenging problem that has thus far not yet been resolved.

In developing such a mixed refrigerant replacement it is necessary to find a reasonable compromise between the various properties of the new refrigerant as compared to the refrigerant being replaced. Although, in general, such differences should be as minimal as possible, such differences are tolerable because of specific designs and applications of the system.

SUMMARY OF THE INVENTION

Accordingly, it is an object of the present invention to provide a refrigerant which can serve as a replacement for an existing CFC refrigerant of the type subject to government restrictions because of environmental problems.

A further object of the present invention is to provide a replacement for an R-12 refrigerant, typically utilized in automobile air conditioning systems.

Yet, another object of the present invention is to provide a mixed refrigerant which can replace an existing CFC refrigerant and which provides environmental safety, material compatibility, oil compatibility, equipment compatibility, non-flammability, non-toxicity, a high coefficient of performance and has sufficiently reasonable commercial costs.

These and other objects, features and advantages of the invention will, in part, be pointed out with particularity, and will, in part, become obvious from the following detailed description of the invention, taken in conjunction with the accompanying drawings, which form an integral part thereof.

DESCRIPTION OF THE PREFERRED EMBODIMENT

Figure 1:
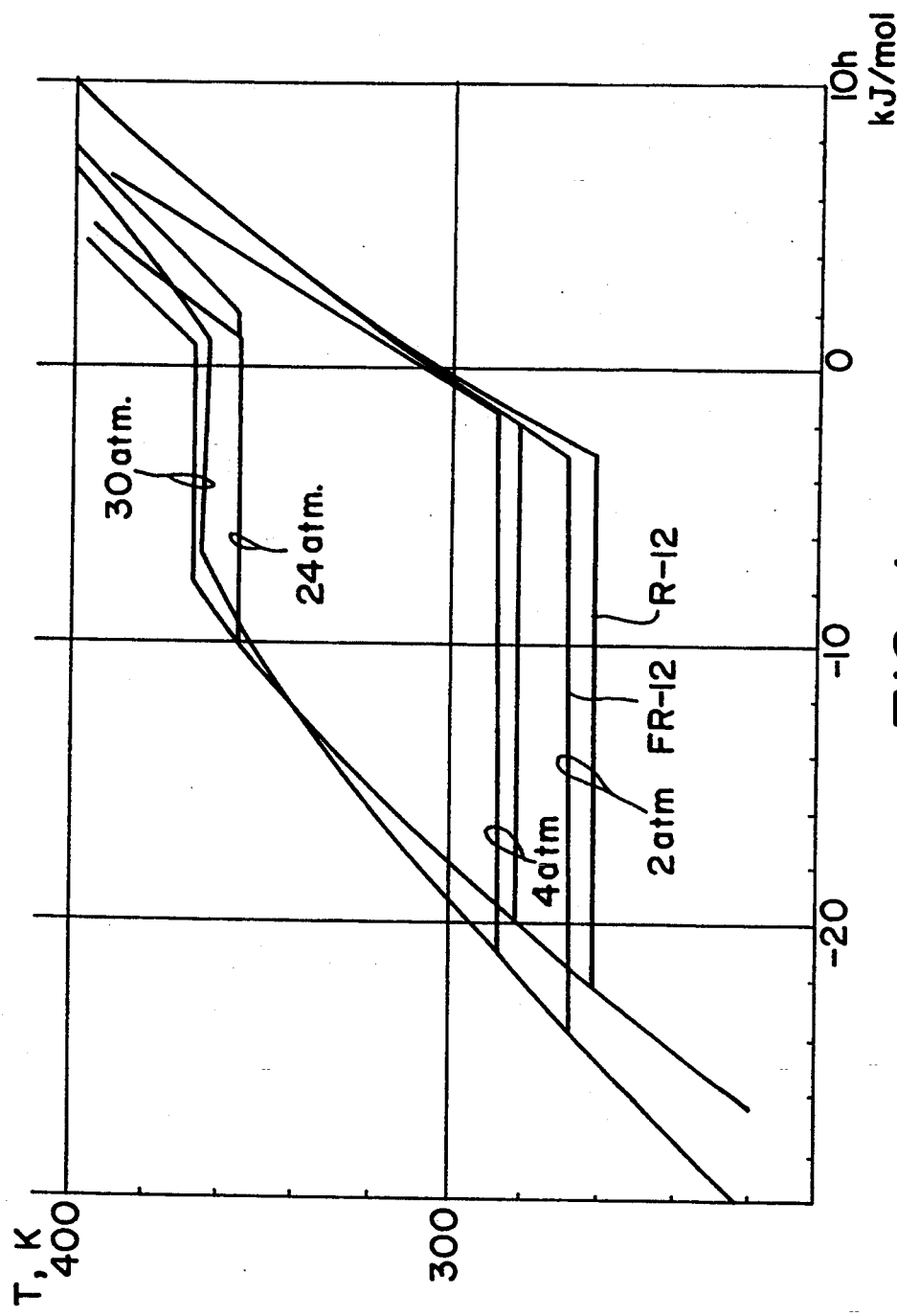
FIGS. 1-4 show thermodynamic curves of temperature versus enthalpy for 4 mixed refrigerants in accordance with the present invention.

The present invention provides for a mixed gas refrigerant which can serve as a replacement for CFC refrigerants and, specifically, is useful for replacement of the R-12 refrigerant. The present invention recognizes that there are numerous constraints that must be addressed and that no single component provides an adequate coverage to meet all of the constraints. Specifically, these constraints include the environmental safety constraints which include the ozone depletion potential, global warming potential, and low toxicity. Also to be addressed are the material compatibility aspects of the mixture such that it should not deteriorate the other components of the system. The mixed refrigerant should not leak through seals and hoses of the system. Oil compatibility is of major significance since the material must be able to work with existing oils in the equipment. Equipment compatibility is another problem which must be met by the gas mixture. Also, there should not result a flammability problem in the event of leakage of one or more of the components.

The co-efficient of performance of the ultimate product must be such that the thermodynamic characteristics of the ultimate gas mixture must meet those of the refrigerants being replaced and it must operate efficiently. Of course, the commercial aspects are such that the components of the mixture should be relatively reasonable in cost and available on the market.

A very serious problem is the flammability problem. Although there exist numerous flammability tests, and while some of the tests can be met with a minimal amount of non-flammable components, others tests are more stringent and require even more limited amounts of non-flammable components. It is thus necessary to restrict the amount of hydrocarbons present to a minimal amount and, in many cases, even delete it. However, in doing so, one loses the benefits of the oil compatibility which is provided by the hydrocarbons, as well as some of the environmental benefits provided by the hydrocarbons. Likewise, hose compatibility is aided by the presence of the hydrocarbons.

Accordingly, by reducing or eliminating the hydrocarbon presence in a mixed refrigerant replacement for R-12, there is extreme difficulty in meeting all of the constraints and, at the same time, providing good thermodynamic performance.

The present invention has come about after many, many components, mixed gas refrigerants, and other recommendations for refrigerants have been tested. While many of those tested have resulted in success with respect to one or more of the constraints, thus far no mixture has been found that can satisfy all of the requirements as a full replacement. The present invention, however, has identified a most unique blend of three basic components which, after numerous tests it has been found that these three components can substantially satisfy all of the requirements for compatibility with the R-12 refrigerant. Such ability to obtain a unique combination of ingredients which does substantially satisfy all of the constraints after numerous tests has not been thought possible in view of the many available blends and mixtures already on the market and many blends and mixtures which have been tested by the present applicants.

The present invention has discovered that the three basic core ingredients which are required for providing the R-12 replacement are tetrafluoroethene—R-134 ($C_2H_2F_4$); monochlorotetrafluoroethene—R-124 ($C_2HClF_4$) and n-butane. The ranges of content of each of these components are that R-134a should be within 43–83 molar percent; R-124 should be within 10–50 molar percent and n-butane should be between 4–11 molar percent.

As additional components which can be utilized by limiting some of the above percentages and adding others, there are included the additional components of SF6, R-125 ($C_2HF_5$); R-218 ($C_3H_3F_5$); R-318 ($C_4F_8$) and R-123 ($C_3HCL_2F_3$).

All of the above are non-flammable fluorocarbons that can be used as additional components. Furthermore, other flammable components that can be utilized, although their flammability is substantially less than that of the hydrocarbons, would include R-142b ($C_2H_3ClF_2$) and R-152a ($C_2H_4F_2$).

By way of example, there are presented the following examples in which all proportions are in molar percentages:

EXAMPLE 1

This example shows a gas mixture utilizing the basic three components:

| | |
|---|---|
| R-134A | 63% |
| R-124 | 30% |
| n-butane | 7% |

The thermodynamic curves of this mixture are shown in FIG. 1.

EXAMPLE 2

This example shows the presence of the same three basic components in different percentages:

| | |
|---|---|
| R-134A | 55% |
| R-124 | 37% |
| n-butane | 8% |

Figure 2:
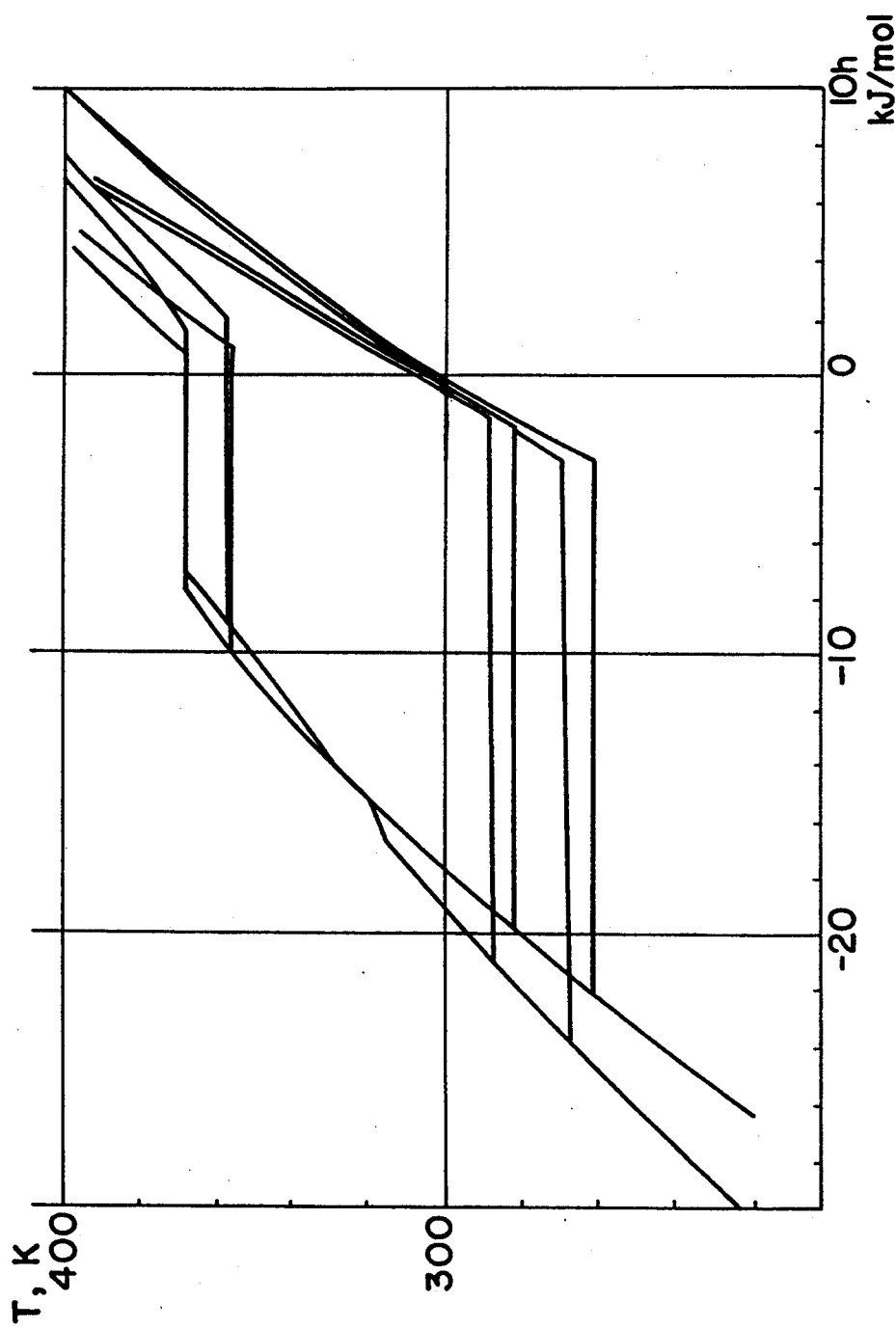

The thermodynamic curves of this mixture are shown in FIG. 2.

EXAMPLE 3

This example shows a four-component mixture having the basic three components with an additional non-flammable fluorocarbon:

| | |
|---|---|
| R-134a | 53% |
| R-124 | 37% |
| n-butane | 8% |
| R-125 | 2% |

Figure 3:
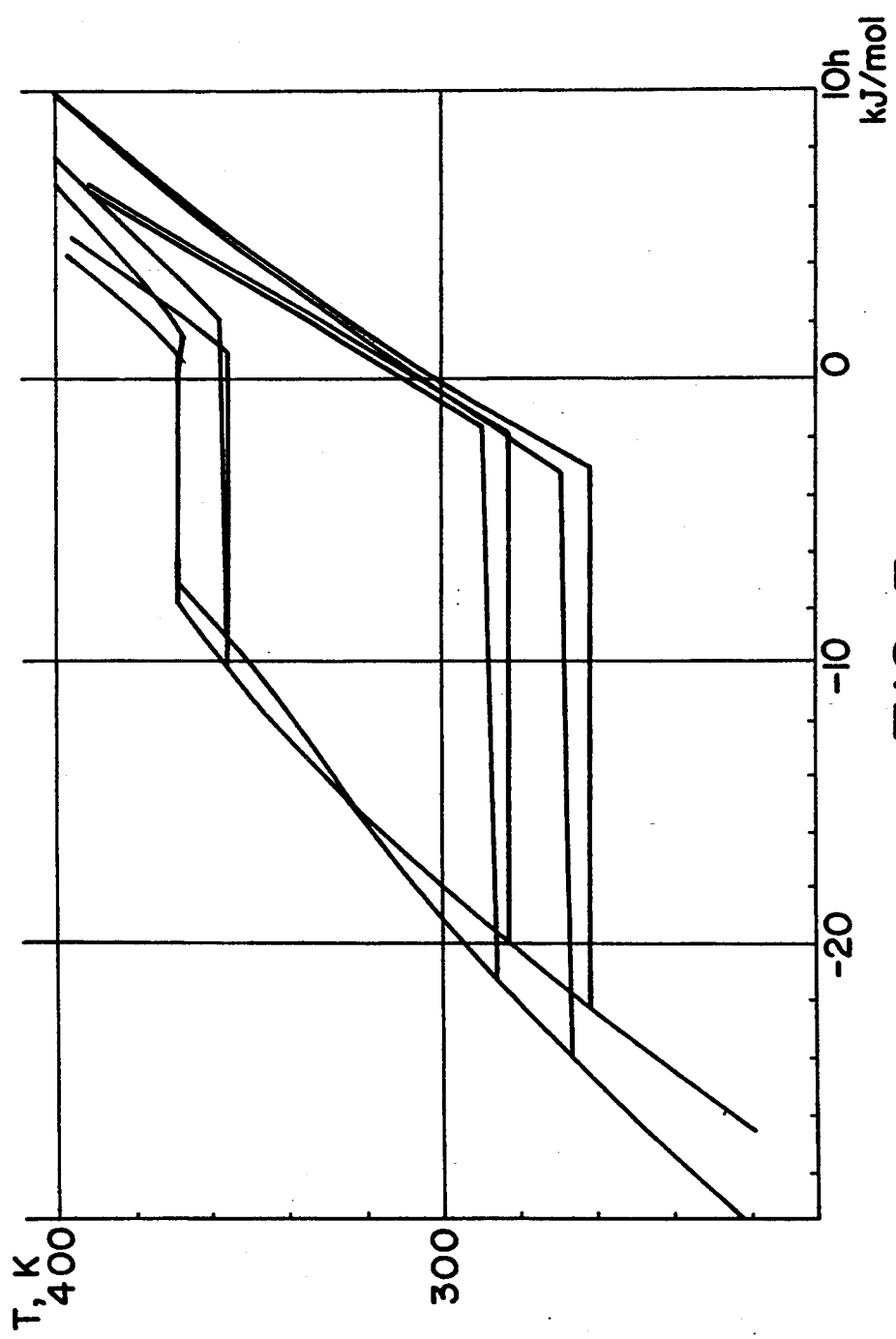

The thermodynamic curves of this mixture are shown in FIG. 3.

EXAMPLE 4

This example shows the use of the basic three components with an additional flammable fluorocarbon:

| | |
|---|---|
| R-134A | 60% |
| R-124 | 25% |
| n-butane | 5% |
| R-142b | 10% |

Figure 4:
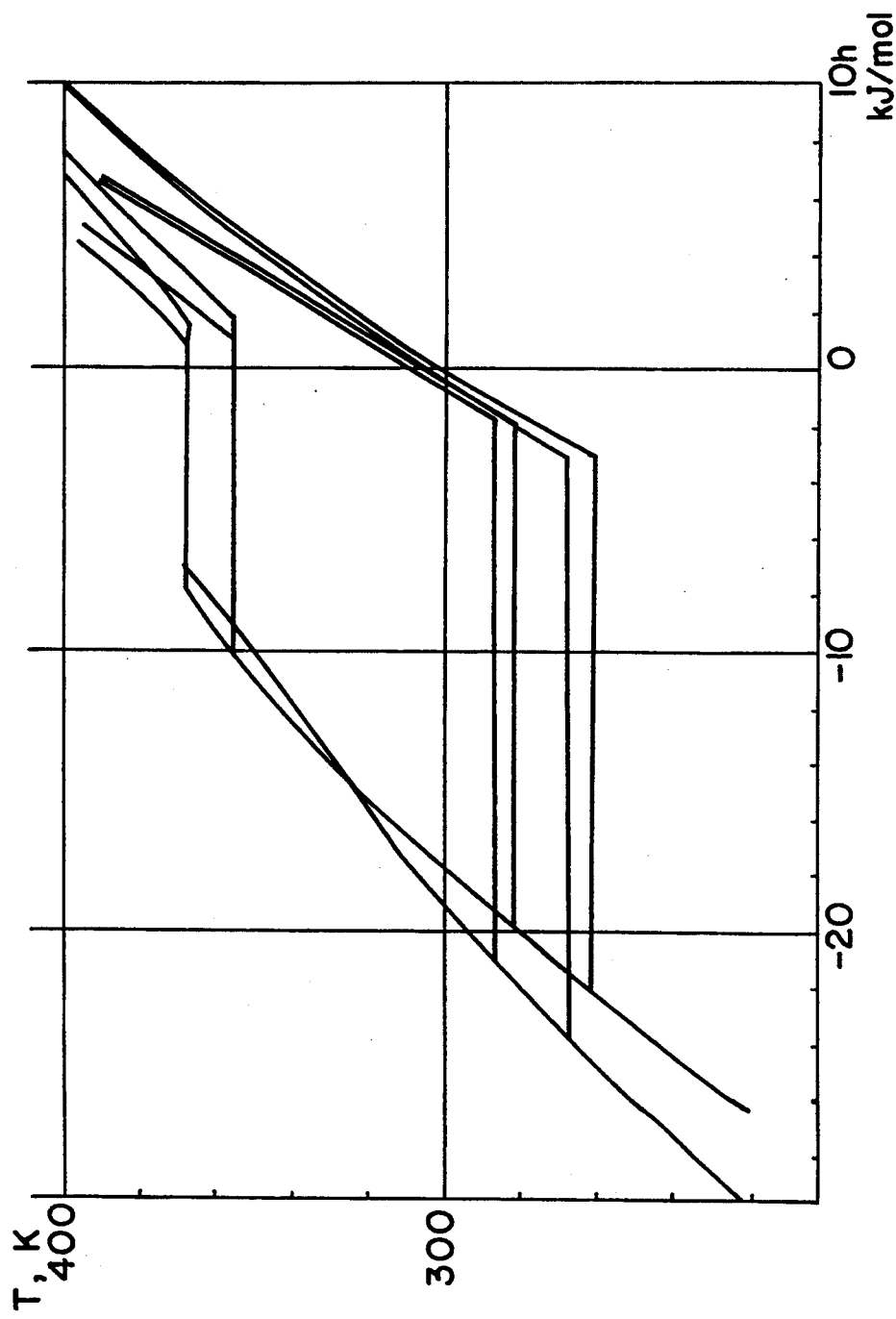

The thermodynamic curves of this mixture are shown in FIG. 4.

Numerous other mixtures using the basic three-core components have been tried within the aforementioned limitations of the ranges and components and, in general, they have each been found rather successful. The variations in each depend upon the particular thermodynamic characteristics resulting, and the particular efficiencies with respect to the other constraints.

There has been disclosed heretofore the best embodiments of the invention presently contemplated. However, it is to be understood that various changes and modifications may be made thereto without departing from the spirit of the invention.

We claim:

1. A refrigerant composition for use as a substitute for R-12 in R-12 refrigeration apparatus, comprising a mixture of:
   (i) 61–65 molar % of R-134a;
   (ii) 28–32 molar % of R-124; and
   (iii) 4–9 molar % of n-butane.

2. A refrigerant composition for use as a substitute for R-12 in R-12 refrigeration apparatus, comprising a mixture of:
   (i) 53–57 molar % of R-134a;
   (ii) 35–39 molar % of R-124; and
   (iii) 6–10 molar % of n-butane.

3. A refrigerant composition for use as a substitute for R-12 in R-12 refrigeration apparatus, consisting of a mixture of:
   (i) 61–65 molar % of R-134a;
   (ii) 28–32 molar % of R-124; and
   (iii) 5–9 molar % n-butane.

4. A refrigerant composition for use as a substitute for R-12 in R-12 refrigeration apparatus, consisting of a mixture of:
   (i) 53–57 molar % of R-134a;
   (ii) 35–39 molar % of R-124; and
   (iii) 6–10 molar % n-butane.

* * * * *

UNITED STATES PATENT AND TRADEMARK OFFICE
CERTIFICATE OF CORRECTION

PATENT NO. : 5,425,890
DATED     : June 20, 1995
INVENTOR(S) : Boris V. Yudin, Moscow Region It is certified that error appears in the above-identified patent and that said Letters Patent is hereby corrected as shown below:

On the title page, item [75] should read as follows:

[75] Inventors:   Boris V. Yudin, Moscow region Russian Federation; Richard Stevenson, Mesa Arizona; Mikhail Boyarsky, Moscow Region Russian Federation; Oleg N. Podcherniev, Moscow Region Russian Federation Signed and Sealed this Twenty-sixth Day of September, 1995

BRUCE LEHMAN

*Attest:*

*Attesting Officer*       *Commissioner of Patents and Trademarks*